(12) United States Patent
Joshi et al.

(10) Patent No.: US 8,766,978 B2
(45) Date of Patent: Jul. 1, 2014

(54) METHODS AND APPARATUS FOR GENERATING CURVED EXTRUSIONS

(75) Inventors: Pushkar P. Joshi, Fremont, CA (US);
Gavin S. P. Miller, Los Altos, CA (US);
Peter F. Falco, Jr., Saratoga, CA (US)

(73) Assignee: Adobe Systems Incorporated, San Jose, CA (US)

( * ) Notice: Subject to any disclaimer, the term of this patent is extended or adjusted under 35 U.S.C. 154(b) by 547 days.

(21) Appl. No.: 12/790,570

(22) Filed: May 28, 2010

(65) Prior Publication Data
US 2013/0120355 A1 May 16, 2013

(51) Int. Cl.
*G06T 17/00* (2006.01)

(52) U.S. Cl.
USPC ........... 345/420; 345/581; 345/619; 345/646; 703/1

(58) Field of Classification Search
USPC ................................. 345/619, 420
See application file for complete search history.

(56) References Cited

U.S. PATENT DOCUMENTS

| | | | |
|---|---|---|---|
| 5,459,820 A | 10/1995 | Schroeder et al. | |
| 6,650,339 B1 * | 11/2003 | Silva et al. ...... | 345/619 |
| 6,781,597 B1 * | 8/2004 | Vrobel et al. ...... | 345/619 |
| 7,233,326 B1 * | 6/2007 | Silva et al. ...... | 345/419 |
| 8,400,455 B2 | 3/2013 | Gregory et al. | |
| 2001/0055013 A1 * | 12/2001 | Fuki ...... | 345/419 |
| 2008/0100615 A1 * | 5/2008 | Zhao et al. ...... | 345/420 |
| 2008/0121315 A1 * | 5/2008 | Gigliotti et al. ...... | 148/120 |
| 2009/0110307 A1 * | 4/2009 | Markowitz ...... | 382/232 |
| 2013/0076619 A1 | 3/2013 | Carr | |
| 2013/0120357 A1 | 5/2013 | Joshi | |

FOREIGN PATENT DOCUMENTS

EP 0710381 B1 8/1996

OTHER PUBLICATIONS

Snibbe, S., Herndon, K. P., Robbins, D. C., Brookshire Conner, D., and Van Dam, A 1992, Using deformations to explore 3D widget design, In Proceedings of SIGGRAPH '92, Comput. Graph, 26, 2 (July), 351-352.
"Axial deformations: an intuitive technique," Lazarus, F., Coquillart, S., Jancene, P., Computer-Aided Design, vol. 26, Issue 8, Aug. 1994, pp. 607-613.
"Wires: a geometric deformation technique," Singh, K., Fiume, E., Proceedings of the 25th annual conference on Computer graphics and interactive techniques, pp. 405-414 (1998).
"A survey of spatial deformation from a user-centered perspective," Gain, J, Bechmann, D., ACM Transactions on Graphics (TOG), vol. 27 Issue 4, Oct. 2008, pp. 1-36.

(Continued)

*Primary Examiner* — Phi Hoang
(74) *Attorney, Agent, or Firm* — Wolfe-SBMC

(57) ABSTRACT

Methods and apparatus for generating curved extrusions. A user interface may be provided via which the value of one or more extrusion parameters and/or a reference point may be changed. The extrusion parameters may include a depth parameter that controls the amount of extrusion, an X angle parameter that controls the angle of bend in the X direction, a Y angle parameter that controls the angle of bend in the Y direction, a scale parameter that controls the scale factor, and a twist parameter that controls the angle of extrusion twist. A weight function for changing one or more of the extrusion parameters non-uniformly along the sweep path may also be provided. An extrusion may be generated from an initial 2D object according to the set of extrusion parameters and the reference point.

18 Claims, 13 Drawing Sheets

(56) References Cited

OTHER PUBLICATIONS

"Free-form design using axial curve-pairs," Hui, K.C., Computer-Aided Design, vol. 34, Issue 8, Jul. 2002, pp. 583-595.

"Bender: A virtual ribbon for deforming 3D shapes in biomedical and styling applications," Llamas I., Powell, A., Rossignac, J., and Shaw, C.D., Proceedings of the 2005 ACM symposium on Solid and physical modeling, pp. 89-99.

U.S. Appl. No. 13/608,786, filed Sep. 10, 2012, entitled "Methods and Apparatus for Freeform Deformation of 3-D Models", Nathan A. Carr, et al.

U.S. Appl. No. 13/194,836, filed Jul. 29, 2011, entitled "Methods and Apparatus for Sweep-Based Freeform Deformation of 3-D Models", inventors Pushkar P. Joshi.

Wang, W., Joe, B., 1997. Robust computation of the rotation minimizing frame for sweep surface modelling. Computer-Aided Design 29, 379-391.

W. Schroeder, W. Lorensen, and S. Linthicum. Implicit modeling of swept surfaces and volumes. In Proceedings of IEEE Visualization '94, pp. 40-45. IEEE Press, Oct. 1994.

K. Abdel-Malek, D. Blackmore, and K. Joy. Swept volumes: Foundations, perspectives, and applications. International Journal of Shape Modeling, 2001, 41 pages.

J. Johnstone and J. Williams, A rational model of the surface swept by a curve, Comput. Graphics Forum 14(3), 1995, 77-88.

"U.S. Application as Filed", U.S. Appl. No. 12/790,570, filed May 28, 2010, 46 pages.

"Non-Final Office Action", U.S. Appl. No. 13/194,836, Feb. 14, 2014, 11 pages.

\* cited by examiner

Scale = 1.0

Reference point:

Scale = 1.5

Reference point:

Scale = 1.5

Reference point:

Depth = 0

Bend: X = 0°, Y = 0°

Depth = 0

Bend: X = 180°, Y = 0°

Reference point:

Depth = 0

Bend: X = 360°, Y = 0°

Reference point:

ADOBE

METHODS AND APPARATUS FOR GENERATING CURVED EXTRUSIONS

BACKGROUND

Description of the Related Art

Sweep modeling is a type of computer graphics technique that is used to generate solid three-dimensional (3D) models (which may be referred to as extrusions, or curved extrusions) from two-dimensional (2D) surfaces. Sweep modeling generally involves moving or "sweeping" a 2D surface through a 3D space. The volume swept by the path of the surface defines the 3D model, or extrusion. In conventional sweep modeling techniques, a space curve is first explicitly defined by the user. Coordinate frames are formed along the space curve, and then cross sections are extruded along the space curve to generate the 3D model. To make modifications, the user must edit or redefine the space curve. Since these conventional techniques require the user to explicitly define and manipulate the geometry such as the space curve, the user may typically need to have extensive knowledge of 3D modeling geometry and of the sweep modeling tools to successfully apply these techniques to achieve desired results.

SUMMARY

Various embodiments of methods and apparatus for generating curved extrusions are described. Embodiments may provide a method for generating curved extrusions that uses a set of user-adjustable parameters to control the shape of curved extrusions. At least some embodiments may implement curved extrusion as a translational sweep. In conventional translational sweep modelers, the user directly modifies the sweep path in order to obtain curved extrusions. However, the sweep path is a non-planar space curve, and editing a non-planar space curve point-by-point is a difficult task. Embodiments may provide users with the ability to utilize a subset of the sweep modeling paradigm without having to modify each point along the sweep path. This is accomplished by encapsulating the shape of the sweep path and the properties of the extrusion along the sweep path into a set of extrusion parameters. This enables embodiments to generate a significant subset of shapes that can be produced by sweep modeling much faster and more intuitively than with conventional sweep modeling methods.

In at least some embodiments, an input 2D object in the XY plane to be extruded in the Z direction may be obtained. The 2D object may be open or closed, and may contain one or many disjoint components. The curved extrusion is performed as a translational sweep along a polyline curve. The sweep curve, or sweep path, by default, is a straight path perpendicular to the XY plane that contains the 2D object (i.e., the sweep path is initially along the Z direction). One or more inputs modifying at least one of a set of extrusion parameters and/or a reference point may be obtained. In some embodiments, a user interface may be provided via which the user may change the value of one or more of the extrusion parameters and/or change the reference point, as desired. The extrusion parameters used in at least some embodiments may include a depth parameter that controls the amount of extrusion, an X angle parameter that controls the angle of bend in the X (horizontal) direction, a Y angle parameter that controls the angle of bend in the Y (vertical) direction, a scale parameter that controls the scale factor, and a twist parameter that controls the angle of extrusion twist. In addition, at least some embodiments may provide users with the ability to selectively set a reference point for the extrusion curve. In some embodiments, the user may also control a weight function for changing one or more of the extrusion parameters non-uniformly along the sweep path. After the user has selectively modified one or more of the parameters via the user interface, an extrusion may be generated from the initial 2D object according to the set of extrusion parameters and the reference point. A sweep path for performing the extrusion is automatically generated according to the extrusion parameters and the reference point; the user does not have to explicitly define the sweep path as in conventional techniques.

Figure 1:
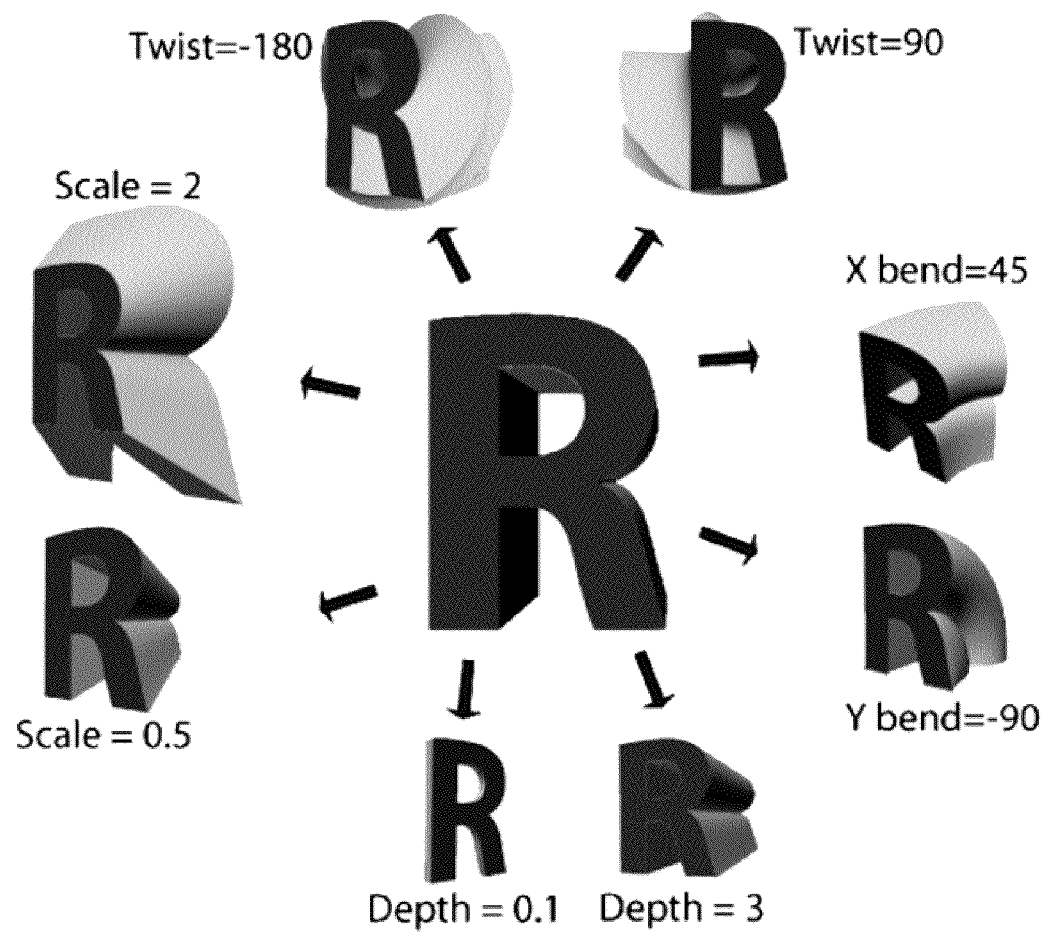
FIG. 1 graphically illustrates various examples of extrusion effects that may be achieved via the extrusion parameters twist, X angle, Y angle, depth, and scale, according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods and apparatus for generating curved extrusions are described. Embodiments may provide a method for generating curved extrusions that uses a set of user-adjustable parameters to control the shape of curved extrusions. Embodiments may simplify curved extrusion (sweep modeling) by encapsulating sweep parameters into a set of intuitive extrusion parameters that can easily be controlled by even a novice user. In at least some embodiments, these extrusion parameters may be used to control the amount of extrusion, angle of bend in the X (horizontal) direction, angle of bend in the Y (vertical) direction, scale factor for growing or shrinking the extrusion, and angle of extrusion twist. In addition, at least some embodiments may provide users with the ability to selectively set a reference point for the extrusion curve. Given this relatively small, intuitive set of extrusion parameters, an expressive extrusion modeling technique may be provided that can be used by users to more easily generate a wide variety of curved extruded shapes than can be done using conventional sweep modeling techniques. Embodiments provide an extrusion modeling technique that is more accessible to users unfamiliar to three-dimensional (3D) modeling than are conventional sweep modeling techniques. Via the set of extrusion parameters, the extrusion modeling technique is intuitive and expressive—a user can quickly obtain complex shapes that would take a long time in other 3D modeling tools. A sweep path for performing the extrusion is automatically generated according to the extrusion parameters and the reference point; the user does not have to explicitly define the sweep path as in conventional techniques.

Figure 13:
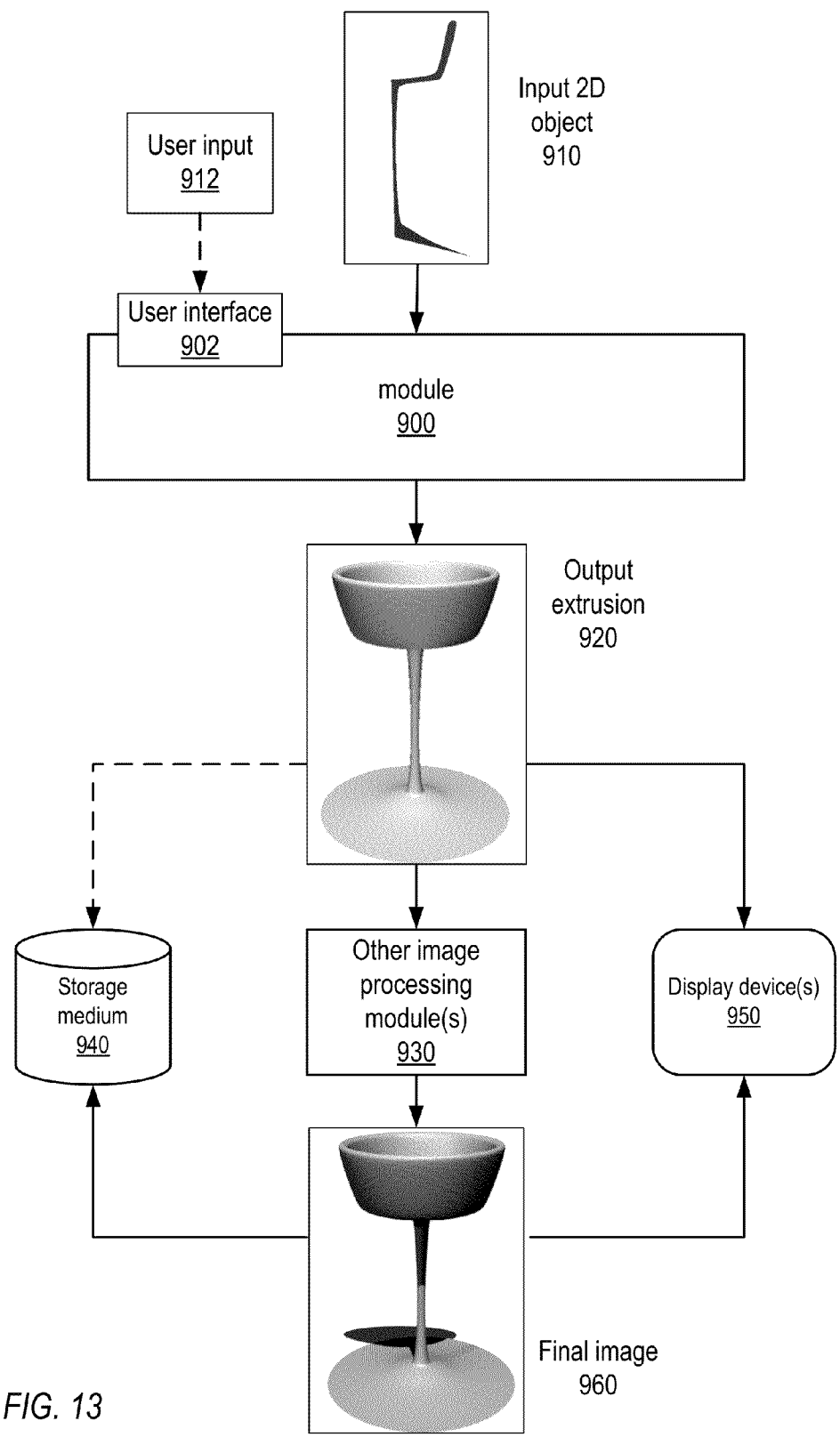
FIG. 13 shows an example of an extrusion modeling module according to at least some embodiments.
Figure 14:
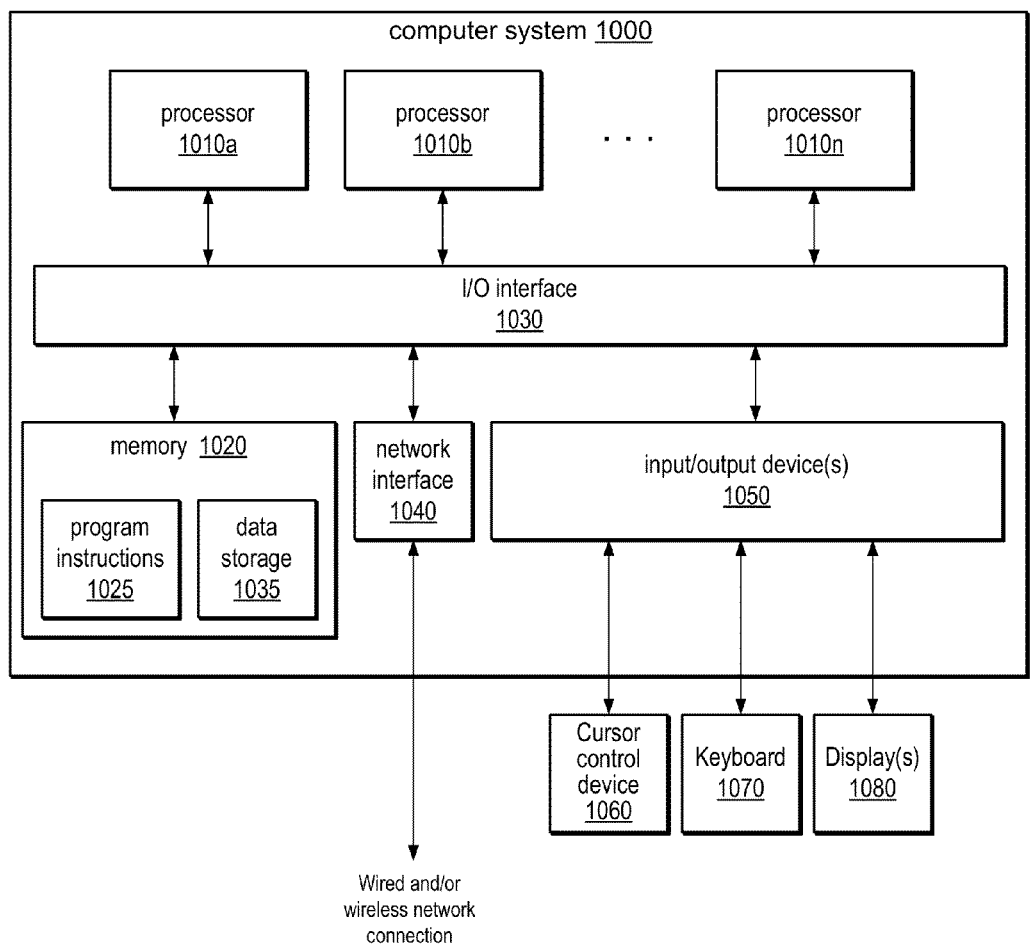
FIG. 14 shows an example system on which embodiments of the extrusion modeling module may be implemented.

Embodiments of an extrusion modeling technique as described herein may be implemented as or in a stand-alone application or as a module of or plug-in for a graphics application or graphics library that may provide other graphical/digital image processing tools. An implementation of the extrusion modeling technique may be referred to as an extrusion modeling module. Embodiments of the extrusion modeling module may, for example, be implemented as a stand-alone tool in an application, and may be used in conjunction with other image processing operations and techniques. Examples of types of applications in which embodiments of the extrusion modeling module may be implemented include, but are not limited to, scientific, medical, painting, publishing, digital photography, video editing, games, animation, Computer-Aided Design (CAD), and/or other applications in which digital image processing may be performed. Specific examples of applications in which embodiments may be implemented may include, but are not limited to, Adobe® Photoshop®, Adobe® Illustrator®, and Adobe® After Effects®. Embodiments of the extrusion modeling module may provide a user interface via which the user may specify and modify one or more of the set of extrusion parameters and/or the reference point to achieve various extrusion effects. FIG. 13 shows an example of an extrusion modeling module according to at least some embodiments. FIGS. 10A and 10B and FIGS. 11A and 11B illustrate an example user interface to the extrusion modeling module according to some embodiments. FIG. 14 shows an example system on which embodiments of the extrusion modeling module may be implemented.

At least some embodiments of the extrusion modeling module may implement curved extrusion as a translational sweep. In conventional translational sweep modelers, the user directly modifies the sweep path in order to obtain curved extrusions. However, the sweep path is a non-planar space curve, and editing a non-planar space curve point-by-point is a difficult task. Embodiments of the extrusion modeling module provide users with the ability to utilize a subset of the sweep modeling paradigm without having to modify each point along the sweep path. This is accomplished by encapsulating the shape of the sweep path and the properties of the extrusion along the sweep path into a set of extrusion parameters. This enables embodiments to generate a significant subset of shapes that can be produced by sweep modeling much faster and more intuitively than conventional sweep modeling methods.

Figure 3A:
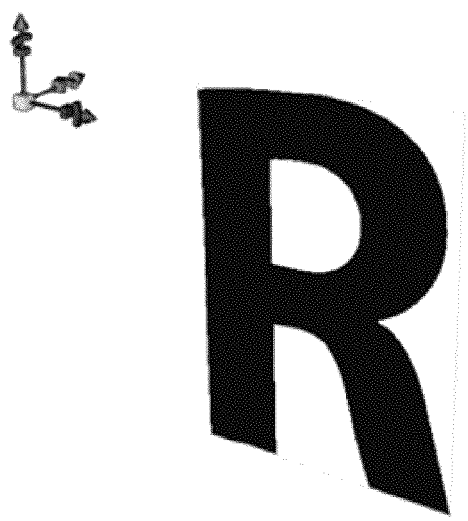
FIGS. 3A through 3C graphically illustrate simulating lathing by bending the extrusion and changing the reference point, according to some embodiments.
Figures 4A, 4B:
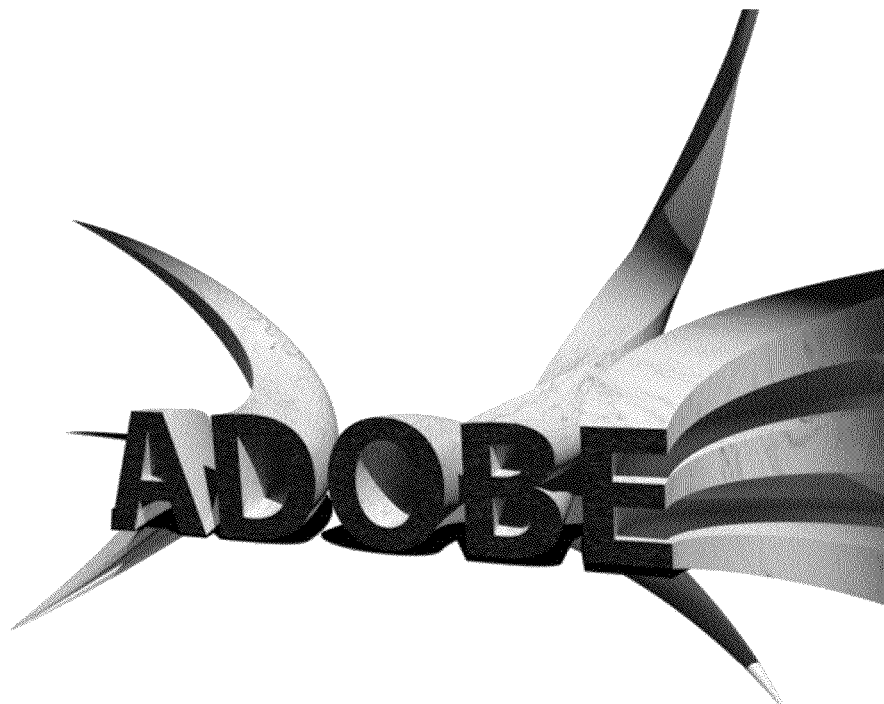
FIG. 4A and 4B illustrate extruding an input 2D object that contains multiple disjoint components according to some embodiments.

Embodiments of the extrusion modeling technique may begin with a two-dimensional (2D) object in the XY plane (for examples, FIGS. 3A, 4A, 10A, and 11A). The 2D object may be open or closed, and may contain one or many disjoint components as shown in FIG. 4A. This 2D object represents the points (or area, in case of closed paths) that need to be extruded. The curved extrusion is performed as a translational sweep along a polyline curve. The sweep curve, or sweep path, by default, is a straight path perpendicular to the XY plane that contains the 2D object (i.e., the sweep path is initially along the Z direction). Embodiments of the extrusion modeling module enable users to modify, via a user interface, this sweep path via the intuitive modification of one or more of the set of extrusion parameters and/or the reference point for the sweep path to generate a variety of extrusion effects. The user does not need to be aware of the sweep path, however, and does not need to edit the non-planar space curve representing the sweep path point-by-point as in conventional translational sweep modelers.

While embodiments are described as obtaining an initial 2D object in the XY plane and sweeping the object in the Z direction to generate an extrusion, note that embodiments may be implemented to obtain an initial 2D object on another plane (e.g., the XZ or YZ plane) and then sweep the object in the direction of the third axis (e.g., the Y or X axis) according to the extrusion parameters.

Extrusion Parameters

The extrusion parameters used in at least some embodiments may include a depth parameter that controls the amount of extrusion, an X angle parameter that controls the angle of bend in the X (horizontal) direction, a Y angle parameter that controls the angle of bend in the Y (vertical) direction, a scale parameter that controls the scale factor, and a twist parameter that controls the angle of extrusion twist. In addition, at least some embodiments may provide users with the ability to selectively set a reference point for the extrusion curve. FIG. 1 graphically illustrates various examples of extrusion effects that may be achieved via the extrusion parameters twist, X angle, Y angle, depth, and scale, according to some embodiments.

Depth

The depth parameter may be modified to control the amount of extrusion. The extrusion (side) surface can be made longer or shorter by changing the depth value. The value of the depth parameter specifies the length of the sweep path. Increasing the value of the depth parameter makes the extrusion longer (as shown by depth=3 in FIG. 1); decreasing the value of the depth parameter makes the extrusion shorter (as shown by depth=0.1 in FIG. 1). Note that a depth value of 0 results in a flat 2D object (no extrusion), and that depth=0 is the "default" value for an initial 2D object.

X Angle and Y Angle

The X angle and Y angle parameters may be modified (from default values of 0 degrees) to control bend angle in the X direction and bend angle in the Y direction. These parameters allow the user to modify the shape of the sweep path away from the default straight sweep path. For each of these parameters, the sweep path is smoothly bent by the extrusion modeling module according to the value of the parameter such that the angle between the tangent vectors at the beginning and end (projected to the proper plane) is equal to the specified bend angle. For example, for a bend angle of 45 degrees in the X direction as shown in FIG. 1, the tangent vectors projected in the XZ plane will have an angle of 45 degrees between them. Similarly, for a bend angle of −90 degrees in the Y direction as shown in FIG. 1, the tangent vectors projected in the YZ plane will have an angle of −90 degrees between them.

Using embodiments of the extrusion modeling module, the user can create curved extrusions which, for example, may be used to create flying logos, for simulating lathing, and for other effects. To bend the extrusion in the horizontal direction, the user changes the X angle. The bend angle is distributed uniformly throughout the extrusion surface such that the specified bend angle is the angle made by the back surface with the front surface. Similarly, to bend the extrusion in the vertical direction, the user changes the Y angle. The user may specify both X and Y angles to produce an obliquely curved extrusion.

Shear

Some embodiments may provide the ability to create a shear effect where the front and back surfaces move parallel to each other. These embodiments may allow the user to optionally select a shear effect instead of the default bend effect. For example, the user interface may provide "shear" and "bend" radio buttons, or some other type of user interface elements, that may be used to optionally select between desired effects. With the shear effect selected, changing the X and/or Y angles via the user interface will shear the extrusion surface, with no curved extrusion.

Scale, Twist, and Reference Point

The scale parameter, twist parameter, and reference point control the way in which the sweep path affects the extrusion surface. In at least some embodiments, by default, the scale factor is 1, twist angle is zero and reference point is set to the center of the 2D bounding box (in the XY plane) of the input 2D object.

Scale

The scale parameter controls the scale factor, and allows the user to grow or shrink the extrusion as it is swept along the sweep path. The extrusion can be scaled using the scale parameter so the back surface is a scaled version of the front surface, with the extrusion surface smoothly growing or shrinking to connect the front of the extrusion to the back. In at least some embodiments, the value for scale as specified by the user is the ratio (of scale) applied to the beginning (front) and end (back) of the extrusion. That is, a scale factor of 0.5 will shrink the extrusion by half, and a scale factor of 2 will double the size of the extrusion, as shown in FIG. 1. A scale factor of 0 will collapse the extrusion to a point.

Twist

The twist parameter controls the twist angle, and allows the user to control the rotation of the extruded points about the sweep curve. The extrusion can be twisted by changing the twist angle value; the twist angle specifies the total twist between the front and the back surfaces of the extrusion, and is distributed evenly along the extrusion surface. To achieve this twist effect, in at least some embodiments, at every point of the sweep path, a tangent vector may be defined by the extrusion modeling module. The tangent vector at a given point is used by the extrusion modeling module to rotate the extrusion points that are associated with that point of the sweep. In at least some embodiments, the twist angle may be uniformly distributed along the sweep curve such that the twist (angle of rotation) at the end of the extrusion is the specified twist parameter.

Reference Point

The reference point option allows the user to optionally change the placement of the origin of the sweep path when performing the extrusion. By default, the reference point is the center of the 2D bounding box of the input 2D object. The location of the reference point affects the distance between the sweep path and the points of the path to be extruded. Changing the reference point affects the entire extrusion. For example, a circular path extruded with an X angle of 180 degree will have self-intersections if the reference point is set to be in the middle of the 2D object bounding box, but will not have any self intersections if the reference point is changed to be along the right-most edge of the path bounding box.

The reference point may be changed for one or more of the extrusion parameters, which provides a powerful method for generating a large variety of extrusion effects and shapes. The reference point may be viewed as a temporary 'origin' point used by the extrusion modeling module in the twist, scale and bend operations to measure distances. By default, the reference point is the center of the 2D bounding box of the input 2D object. However, in some embodiments, the user can change the reference point to be on the edge of the bounding box, or at one of the corners. Changing the reference point changes the way in which the twist, scale and bend extrusion parameters control the shape, and thus can be used to produce drastically different shapes by simply changing the reference point.

FIGS. 2A through 2C and FIGS. 3A through 3C graphically illustrate various effects that may be achieved by modifying one or more of the extrusion parameters and/or the reference point, according to some embodiments.

Figure 2A:
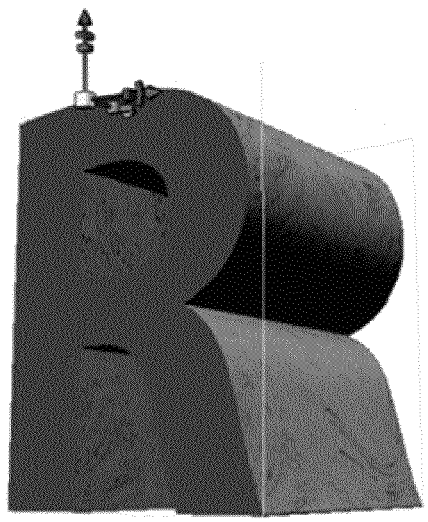
FIGS. 2A through 2C graphically illustrate changing the reference point for a scaled extrusion, according to some embodiments.
Figure 2A:
Figure 2B:
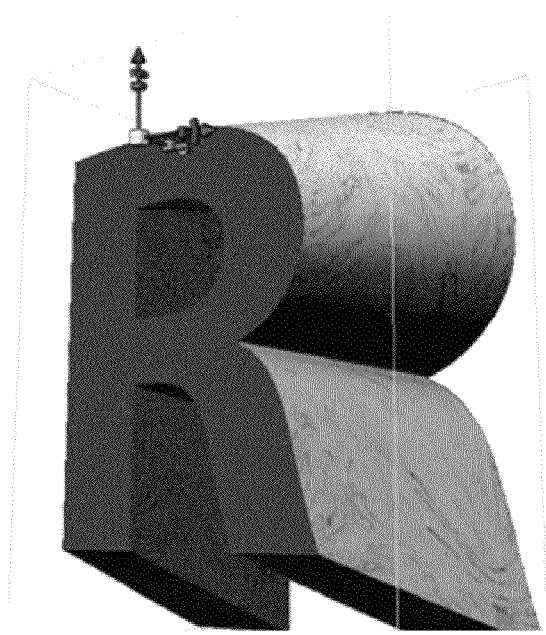
Figure 2B:
Figure 2C:
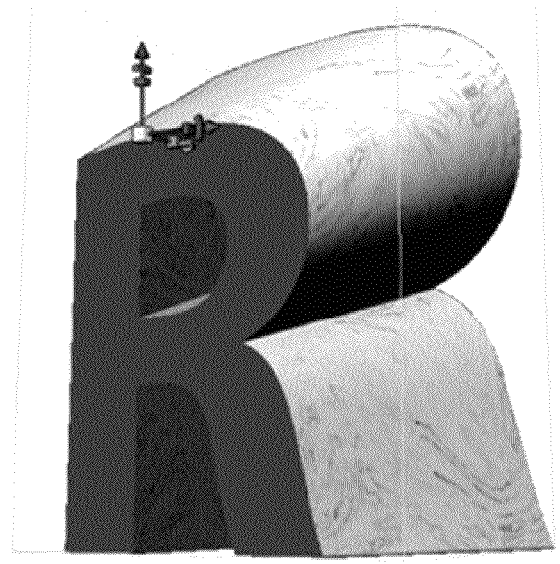
Figure 2C:

FIGS. 2A through 2C graphically illustrate changing the reference point for a scaled extrusion, according to some embodiments. In FIG. 2A, an extrusion of a 2D letter "R" is shown with scale=1 and the reference point set to the default middle position. In FIG. 2B, the scale has been changed to 1.5, with the reference point still set to the default middle position. FIG. 2C shows the effect of changing the reference point to the middle bottom position of the bounding box, while leaving the scale at (or setting the scale to) 1.5.

Figure 3B:
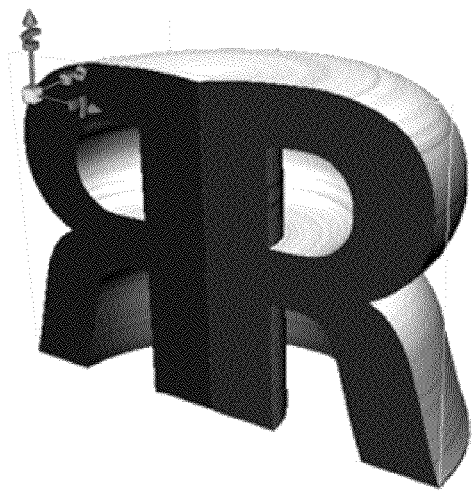
Figure 3B:
Figure 3C:
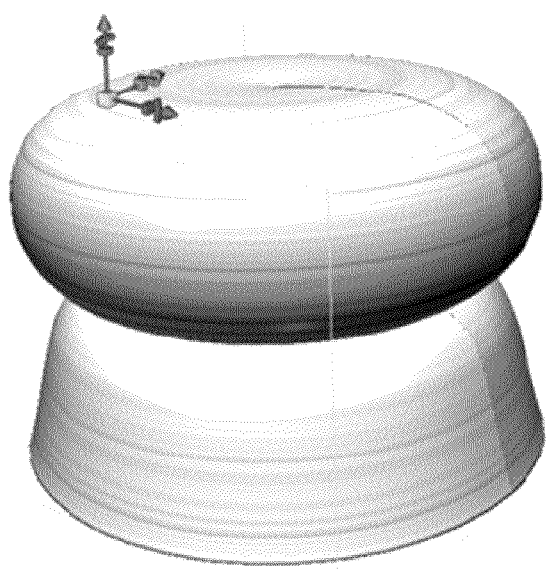
Figure 3C:

FIGS. 3A through 3C graphically illustrate simulating lathing by bending the extrusion and changing the reference point, according to some embodiments. Embodiments of the extrusion modeling module may thus be used to easily simulate lathing, for example by specifying an X angle of 360 degrees and changing the reference point to lie on the right edge of the bounding box (at any point on the right edge, in some embodiments; other embodiments may limit the positions at which the reference point may be set, as further described below). To simulate lathing in the opposite direction, an X angle of −360 degrees may be specified, and the reference point may be changed to lie on the left edge of the bounding box. Angles between −360 and 360 may be specified to create a "partial" lathing effect, as shown in FIG. 3B.

FIG. 3A shows an input 2D object to be extruded (the letter "R"). Depth is 0, mode is bend, and X angle and Y angle are both 0 degrees. The reference point may be at the default, center position. FIG. 3B shows the effect achieved by changing the X angle value to 180 degrees and changing the reference point to the left center of the bounding box. FIG. 3C shows the effect achieved by changing the X angle value to 360 degrees while leaving the reference point at the left center of the bounding box.

Note that changing any of the extrusion parameters keeps the front and front bevel surface unchanged. The back and back bevel surfaces are moved rigidly to accommodate the extrusion deformation.

Changing Extrusion Parameters Along the Sweep Path

As described above, in some embodiments, the extrusion parameters that take numerical values (depth, X angle, Y angle, scale, and twist) are applied uniformly throughout the sweep. In these embodiments, the sweep path cannot change the initial turn that it started with, or have a change of direction. However, the user may desire to change one or more of the extrusion parameters along the sweep path to achieve a desired effect. Some embodiments may thus provide a mechanism for changing one or more of the extrusion parameters along the sweep path.

In some embodiments, this may be achieved by multiplying the extrusion parameters by a user-controllable weight function that is defined along the sweep. The domain of the function (i.e. values for which it is defined) is the parametric interval along the length of the sweep path. By convention, the parametric distance is 0 at the beginning of the sweep path and 1 at the end of the sweep path. Initially and by default, the weight is 1 for all points on the sweep path between (and including) parametric distance 0 and parametric distance 1. However, the user can change the weight function to multiply the parameter values at different points along the path with a different factor. For example, for X angle in bend mode, if the user sets the weight function to be zero at all points but 1 at or close to parametric distance 0.5, there will be a bend in the X direction only in the middle of the extrusion. As another example, for scale, the user may define an undulating, wavy weight function for simultaneously growing and shrinking the extrusion. In some embodiments, the weight function can be positive or negative, and may have no limits on its possible range of values.

Extrusion Examples

FIGS. 1, 2A through 2C, and 3A through 3C graphically illustrate some example extrusion effects that may be achieved using embodiments of the extrusion modeling module. FIGS. 4A through 4B and 5 through 9 illustrate some more complex extrusions that may be achieved using embodiments of the extrusion modeling module. These examples show some of the more complex extrusion effects that can be achieved by modifying two or more of the extrusion parameters and/or the reference point. Note that, in at least some of these examples, shadows or other graphic effects have been added to the extruded 3D objects.

FIG. 4A illustrates an input 2D object that contains multiple disjoint components (the letters "A", "D", "O", "B", and "E"). At least some embodiments may allow the user to extrude the collective 2D object as one object, or to extrude each component separately. FIG. 4B shows an example extrusion generated by extruding each component (the letters "A", "D", "O", "B", and "E") separately using an embodiment of the extrusion modeling module. The following are the extrusion parameter settings for each letter in this example:

A: depth=4.42, scale=0, bend mode, X angle=−115, Y angle=−92.8;
D: depth=4.32, scale=0, bend mode, X angle=−107.5, Y angle=85.4;
O: depth=4.73, scale=0, bend mode, X angle=107.5, Y angle=−86;
B: depth=7.53, scale=0, bend mode, X angle=26, Y angle=90, twist=270;
E: depth=2.36, scale=2.57, bend mode, X angle=90, Y angle=0.

Figure 5:
FIG. 5 shows an extruded 3D object generated from an input 2D object (with the twist parameter modified to give a slight twist to the extruded 3D object.

FIG. 5 shows an extruded 3D object generated from an input 2D object (the beveled letter "G") with the twist parameter modified to give a slight twist to the extruded 3D object. The following are the extrusion parameter settings used to generate this example: depth=1, scale=1, twist: −30, X angle=0, Y angle=0, reference point: middle center.

Figure 6:
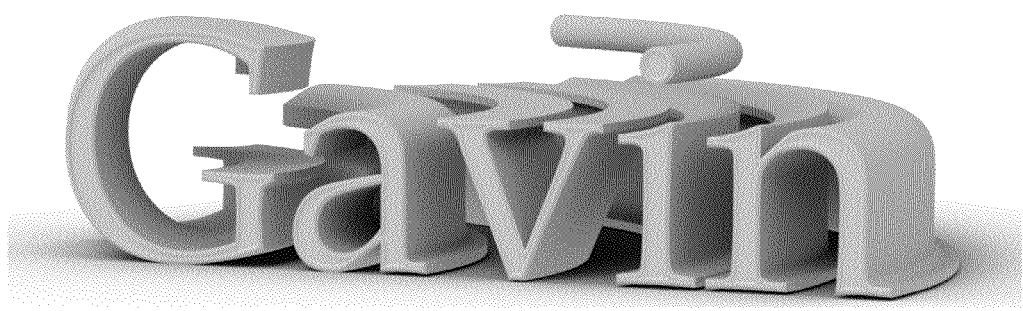
FIG. 6 shows an extrusion generated from an input 2D object with different values specified for the X angle (and the depth) at different components of the input object.

FIG. 6 shows an extrusion generated from an input 2D object representing the word "Gavin". The following are the extrusion parameter settings used to generate this example: depth=1, scale=1, twist: 0, X angle=−60, Y angle=0, reference point: middle left.

Figure 7:
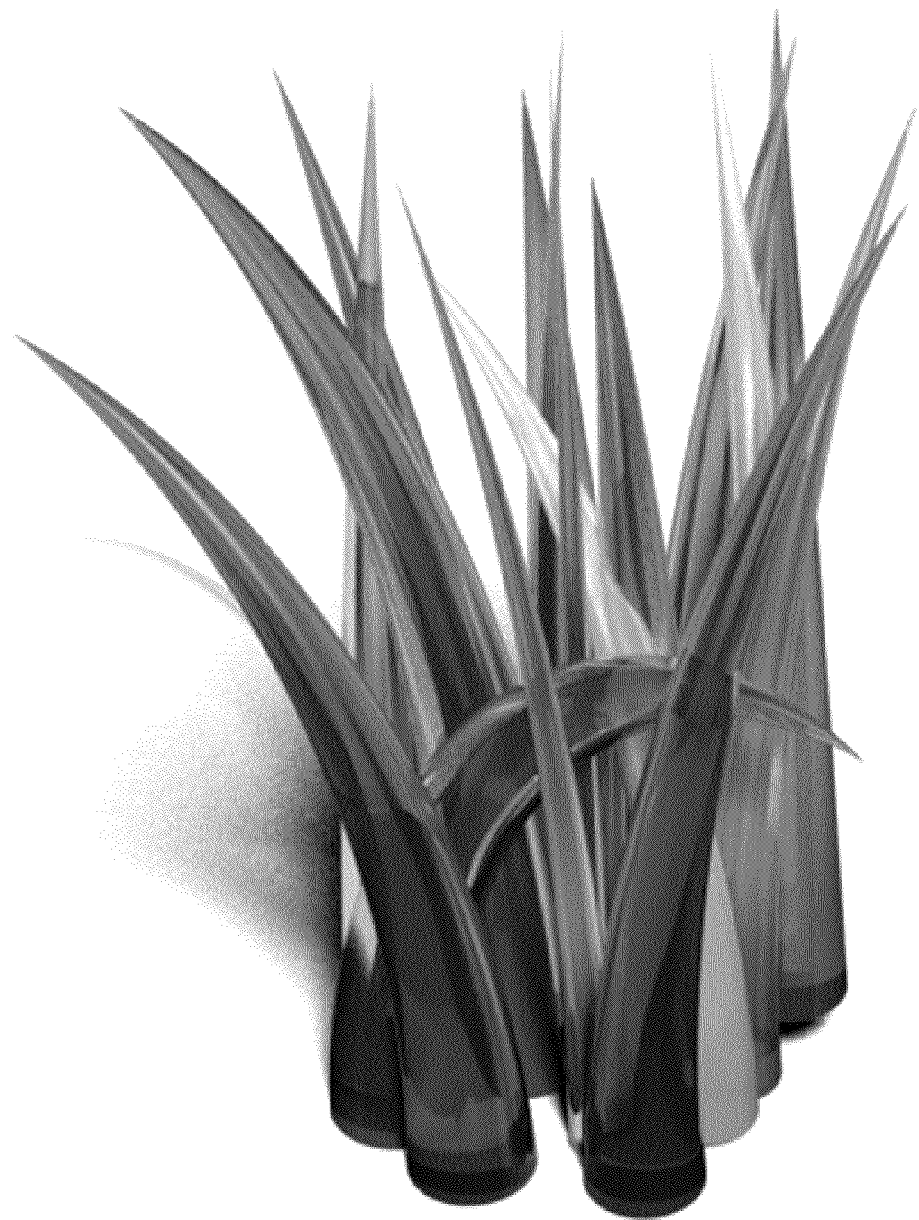
FIG. 7 shows an extrusion generated from a set of 2D circles on a surface, with the bend angle values set at different angles for different circles, and with the scale factor set so that the circles taper to points.

FIG. 7 shows an extrusion generated from a set of 2D circles on a surface, with the bend angle values set at different angles for different circles, and with the scale factor set to 0 so that the circles taper to points.

Figure 8:
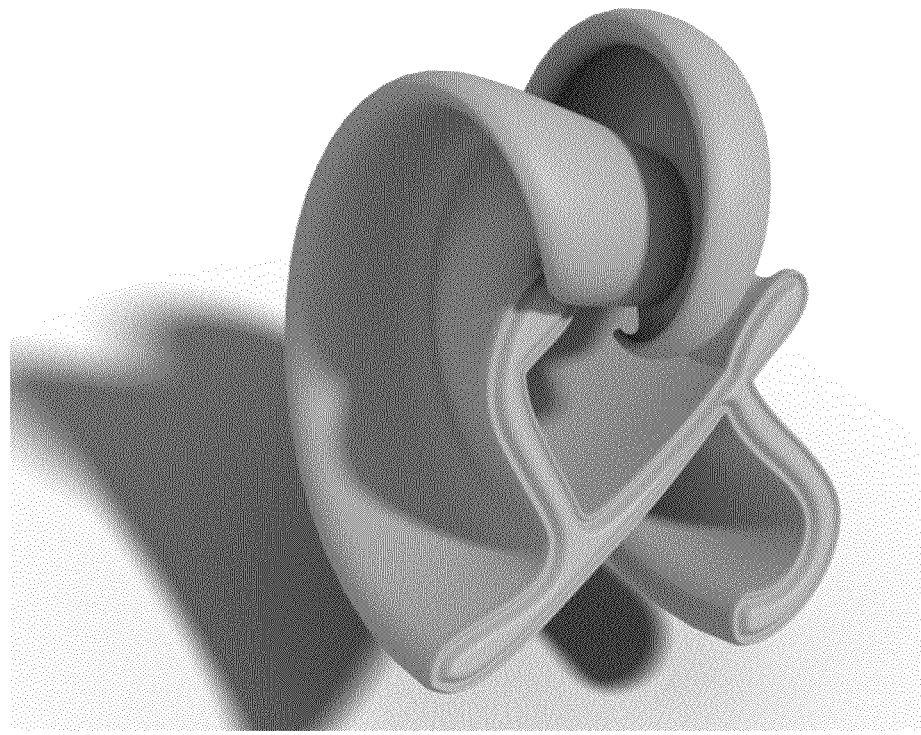
FIG. 8 shows a "seashell" extrusion generated from an input 2D shape by modifying multiple extrusion parameters, including Y angle and scale.

FIG. 8 shows a "seashell" extrusion generated from an input 2D shape by modifying multiple ones of the extrusion parameters, including Y angle, twist, and scale. The following are the extrusion parameter settings used to generate this example: depth=0, scale=0.2, twist=45, X angle=0, Y angle=360, reference point: top center.

Figure 9:
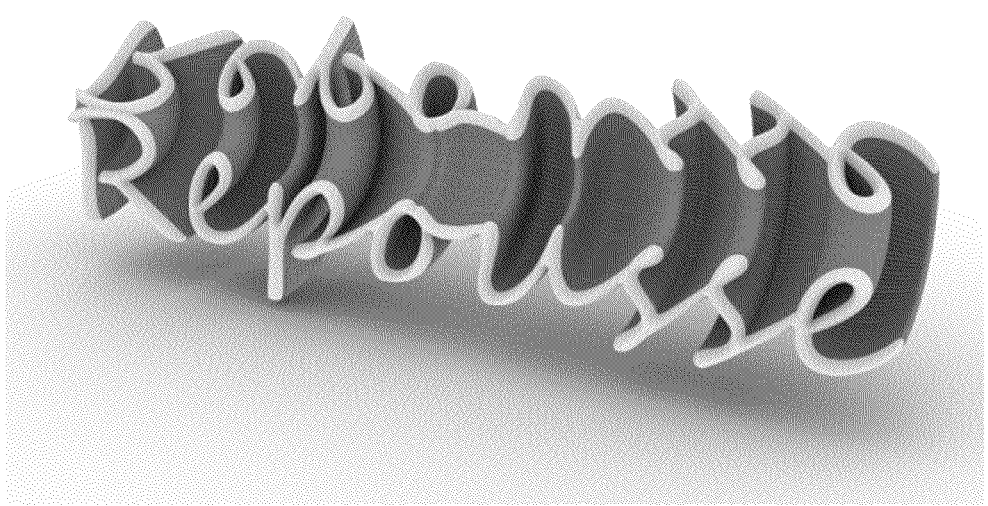
FIG. 9 shows a complex folded extrusion generated from a simple input 2D shape by modifying multiple extrusion parameters.

FIG. 9 shows a complex folded extrusion generated from an input 2D shape representing the word "Repousse" in script. The following are the extrusion parameter settings used to generate this example: depth=1, scale=1, twist=0, X angle=0, Y angle=120, reference point: middle center.

Example User Interface

FIGS. 10A and 10B and FIGS. 11A and 11B illustrate an example user interface to the extrusion modeling module according to some embodiments, and are not intended to be limiting.

Figure 10A:
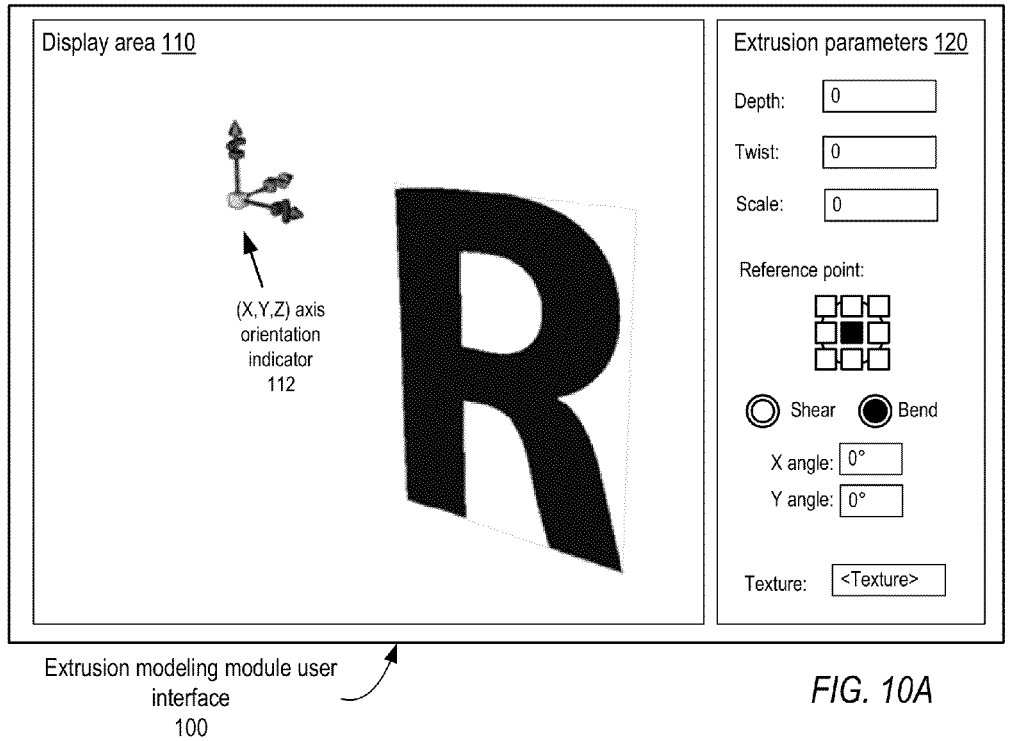
FIGS. 10A and 10B illustrate an example user interface to the extrusion modeling module according to some embodiments.
Figure 10B:
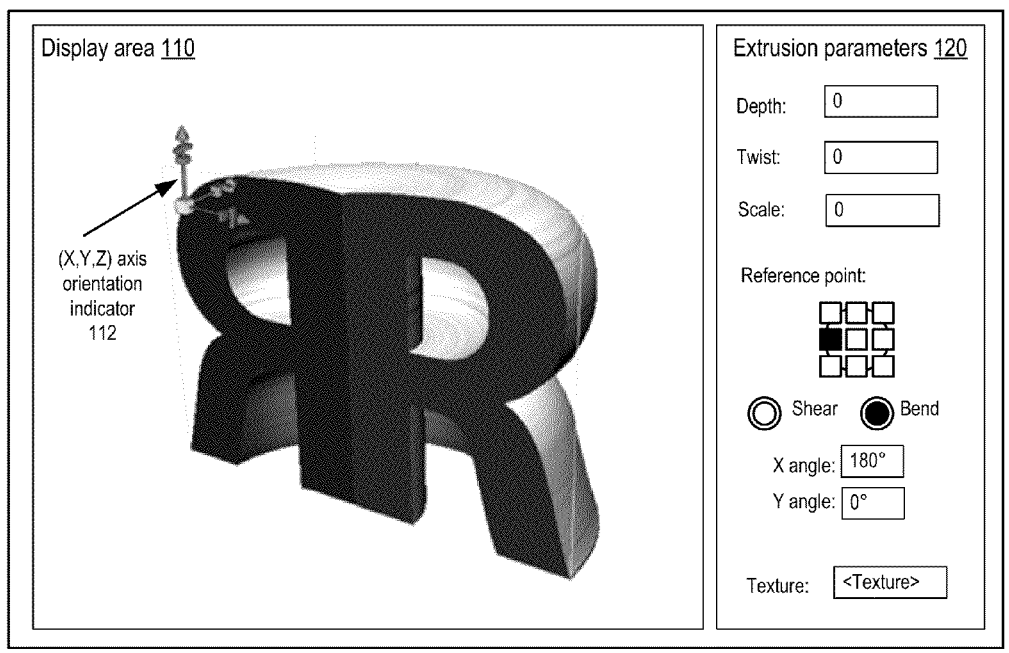

FIGS. 10A and 10B illustrate an example user interface for an extrusion modeling module, according to some embodiments. The extrusion modeling module may provide a user interface 100 via which a user may, for example, provide an initial 2D object to be extruded, interact with the module to specify values for one or more of the extrusion parameters, change the reference point, select bend or shear modes for the X and Y angles, and possibly specify other image processing parameters such as the texture to be used on the surface of the 3D extrusion. The user interface 100 may include an extrusion parameter area 120 which may include one or more user interface elements via which the user may specify values for the extrusion parameters, change the reference point, select bend or shear mode for the X and Y angles, and so on. These user interface elements may, for example, include one or more of alphanumeric text entry boxes, menus, dials, slider bars, buttons, check boxes, radio buttons, or other types of user interface elements that may be used to specify or select values or settings for the extrusion modeling module. Extrusion modeling module user interface 100 may also include a display area 110 on which a selected or specified initial 2D object and extrusions generated from that input object may be displayed. In some embodiments, an (X,Y,Z) axis orientation indicator 112 may be displayed in the display area. FIG. 2A shows an "R" as initial 2D object.

The user interface elements in extrusion parameters area 120 may include a depth user interface element via which the user may specify or modify a value for a depth parameter that controls the amount of extrusion.

The user interface elements in extrusion parameters area 120 may include a twist user interface element via which the user may specify or modify a value for a twist parameter that controls the angle of extrusion twist.

The user interface elements in extrusion parameters area 120 may include a scale user interface element via which the user may specify or modify a value for a scale parameter that controls the scale factor.

The user interface elements in extrusion parameters area 120 may include "shear" and "bend" radio buttons, or some other type of user interface elements, that may be used to optionally select between a shear effect and a bend effect.

The user interface elements in extrusion parameters area 120 may include an X angle user interface element and a Y angle user interface element via which the user may specify or modify a value for an X angle and/or a Y angle that may be used in either the bend effect or the shear effect. If the bend effect is selected, the X angle value controls the angle of bend in the X (horizontal) direction, and the Y angle value controls the angle of bend in the Y (vertical) direction. If the shear effect is selected, changing the X and/or Y angles will shear the extrusion surface according to the specified angles, with no curved extrusion.

The user interface elements in extrusion parameters area 120 may include a user interface element or elements via which the user can selectively set a reference point for the extrusion curve. In some embodiments, the user interface may limit the number of possible positions for the reference point that the user may select. For example, in the example user interface shown in FIG. 10A, the user interface element for controlling the reference point has nine possible settings—middle (the default); top left, top middle, top right; middle left, middle right; and bottom left, bottom middle, bottom right. The user may select a reference point by, for example, clicking on one of the rectangles in the user interface element. Note that, in other embodiments, the user interface may provide more or fewer reference point selections. In some embodiments, the user interface may allow the user to specify any arbitrary point on the 2D bounding box as the reference point.

The user interface 100 may provide one or more other user interface elements for specifying or controlling other parameters. For example, FIG. 10A shows a "texture" user interface element via which the user may specify a texture to be applied to the extrusion. In some embodiments, the user interface 100 may provide one or more user interface elements via which a user may specify a weight function to change one or more of the extrusion parameters along the sweep path.

As shown in FIG. 10A, in some embodiments, by default, the reference point is the center of the 2D bounding box of the input 2D object. The default mode is "bend." Depth, twist, scale, X angle, and Y angle may all be initially set to 0. In FIG. 10B, the user has changed the reference point to middle left, and has changed the X angle to 180 degrees in bend mode. Results of these changes applied to the initial 2D object shown in FIG. 2A are shown in the display area 110 of FIG. 10B.

Figure 11A:
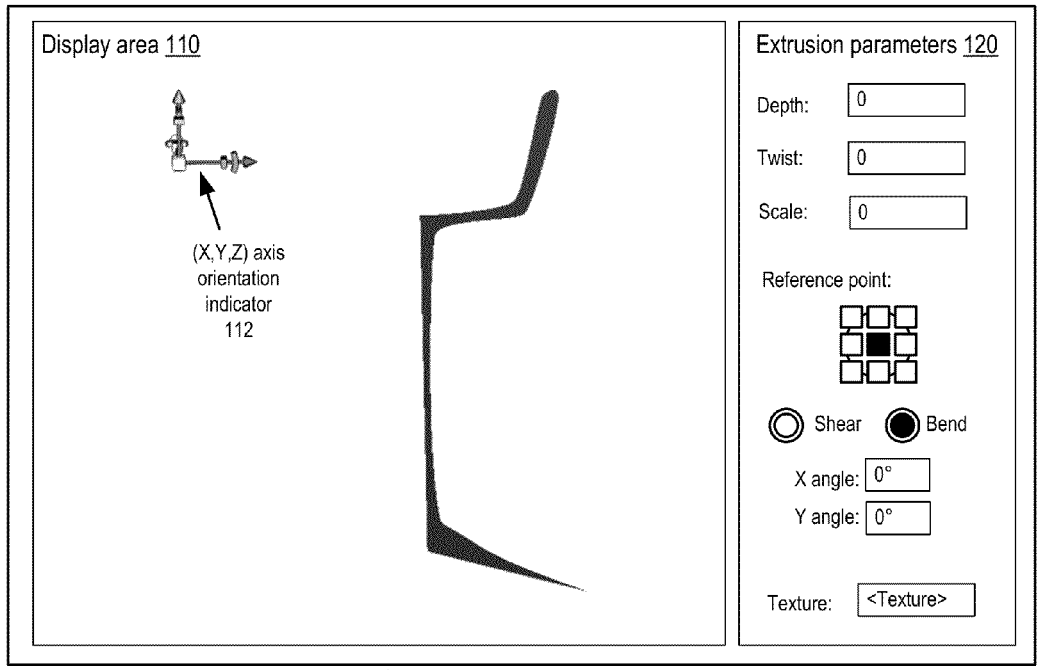
FIGS. 11A through 11C illustrate an example user interface of the extrusion modeling module and an extrusion generated according to some embodiments.
Figure 11B:
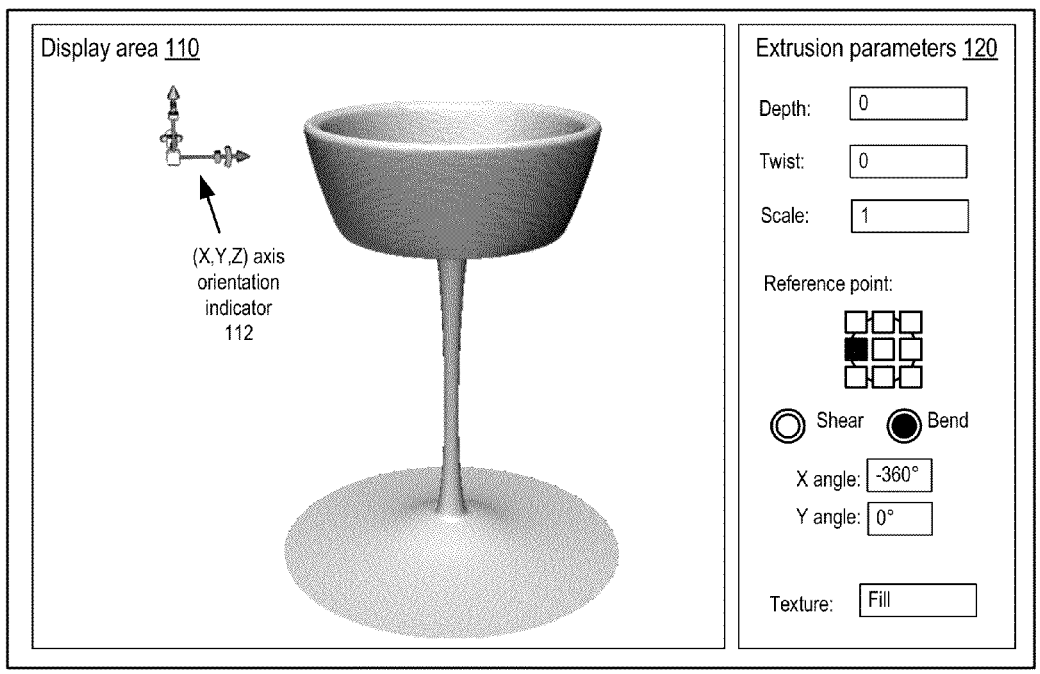

FIGS. 11A and 11B illustrate the example user interface for an extrusion modeling module being applied to a different input 2D object, according to some embodiments. As shown in FIG. 11A, in some embodiments, by default, the reference point is the center of the 2D bounding box of the input 2D object. The default mode is "bend." Depth, twist, scale, X angle, and Y angle may all be initially set to 0. In FIG. 10B, the user has changed the scale to 1, the reference point to middle left, and the X angle to −360 degrees in bend mode. The texture is set to "fill". Results (a wineglass shape) of these changes applied to the initial 2D object shown in FIG. 11A are shown in the display area 110 of FIG. 11B.

Figure 11C:

FIG. 11C shows the extruded 3D object of FIG. 11B after additional image processing techniques have been applied to the 3D object. For example, shadows have been added using a lighting/shadowing technique.

Flowchart of a Method for Extrusion Modeling

Figure 12:
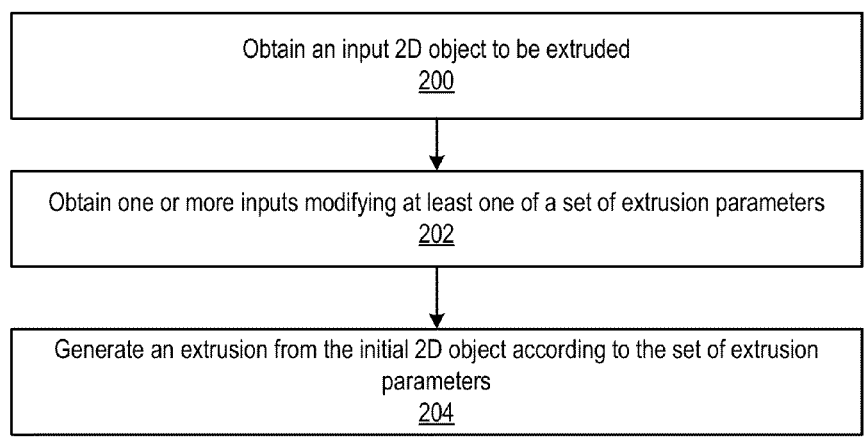
FIG. 12 is a flowchart of a method for extrusion modeling according to some embodiments.

FIG. 12 is a flowchart of a method for extrusion modeling according to some embodiments. As indicated at 200, an input 2D object in the XY plane to be extruded in the Z direction may be obtained. For examples of an initial 2D object, see FIGS. 3A, 4A, 10A, and 11A. The 2D object may be open or closed, and may contain one or many disjoint components as shown in FIG. 4A. The curved extrusion is performed as a translational sweep along a polyline curve. The sweep curve, or sweep path, by default, is a straight path perpendicular to the XY plane that contains the 2D object (i.e., the sweep path is initially along the Z direction). As indicated at 202, one or more inputs modifying at least one of a set of extrusion parameters and/or a reference point may be obtained. For example, a user interface may be provided via which the user may change the value of one or more of the extrusion parameters and change the reference point, as desired. An example user interface that may be used in some embodiments is shown in FIGS. 10A and 10B and FIG. 11A and 11B. The extrusion parameters used in at least some embodiments may include a depth parameter that controls the amount of extrusion, an X angle parameter that controls the angle of bend in the X (horizontal) direction, a Y angle parameter that controls the angle of bend in the Y (vertical) direction, a scale parameter that controls the scale factor, and a twist parameter that controls the angle of extrusion twist. In addition, at least some embodiments may provide users with the ability to selectively set a reference point for the extrusion curve. In some embodiments, the user may also control a weight function for changing one or more of the extrusion parameters non-uniformly along the sweep path. As indicated at 204, an extrusion may be generated from the initial 2D object according to the set of extrusion parameters and the reference point. By way of example, consider FIG. 11C, which illustrates an extrusion generated according to a set of extrusion parameters set through the user interface as shown in FIG. 11B. FIGS. 1 through 11C show examples of various extrusion effects that may be generated according to embodiments. Note that a sweep path for performing the extrusion is automatically generated according to the extrusion parameters and the reference point; the user does not have to explicitly define the sweep path, as in conventional techniques.

Example Extrusion Modeling Module

FIG. 13 illustrates an extrusion modeling module that may implement embodiments of the extrusion modeling technique as described herein, for example as shown in FIG. 12. FIG. 14 illustrates an example computer system on which embodiments of module 900 may be implemented. Module 90 receives as input an input 2D object 910 in the XY plane to be extruded in the Z direction. For examples of an initial 2D object, see FIGS. 3A, 4A, 10A, and 11A. Module 900 may receive user input 912 via a user interface 902 modifying at least one of a set of extrusion parameters and/or a reference point. Module 900 then extrudes the input 2D object 910, according to the set of extrusion parameters and the reference point to generate as output an extrusion 920. Module 900 automatically generates a sweep path according to the extrusion parameters and the reference point; the user does not have to explicitly define the sweep path, as in conventional techniques. The extrusion 920 may, for example, be stored to a storage medium 940, such as system memory, a disk drive, DVD, CD, etc, and/or displayed to a display device 950. The user may, if desired, activate other image processing modules 930 to perform other image processing tasks on the extrusion 920 to generate a final image 960. Final image 960 (as well as one or more intermediary images, if desired) may, for example, be stored to a storage medium 940 and/or displayed to a display device 950.

In at least some embodiments, extrusion modeling module 900 may provide a user interface 902 via which a user may interact with the module 900, for example to modify at least one of a set of extrusion parameters and/or a reference point as described herein. An example user interface that may be used in some embodiments is shown in FIGS. 10A and 10B and FIG. 11A and 11B. The extrusion parameters used in at least some embodiments may include a depth parameter that controls the amount of extrusion, an X angle parameter that controls the angle of bend in the X (horizontal) direction, a Y angle parameter that controls the angle of bend in the Y (vertical) direction, a scale parameter that controls the scale factor, and a twist parameter that controls the angle of extrusion twist. In addition, at least some embodiments may provide users with the ability to selectively set a reference point for the extrusion curve. In some embodiments, the user may also control a weight function for changing one or more of the extrusion parameters non-uniformly along the sweep path.

Example System

Embodiments of an extrusion modeling module may be executed on one or more computer systems, which may interact with various other devices. One such computer system is illustrated by FIG. 14. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of an extrusion modeling module are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 14, memory 1020 may include program instructions 1025, configured to implement embodiments of an extrusion modeling module as described herein, and data storage 1035, comprising various data accessible by program instructions 1025. In one embodiment, program instructions 1025 may include software elements of embodiments of an extrusion modeling module as illustrated in the above Figures. Data storage 1035 may include data that may be used in embodiments. In other embodiments, other or different software elements and data may be included.

Those skilled in the art will appreciate that computer system 1000 is merely illustrative and is not intended to limit the scope of an extrusion modeling module as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method comprising:
    obtaining a two-dimensional (2D) representation of an object to be extruded;
    obtaining one or more inputs each modifying a value for a respective one of a set of two or more extrusion parameters, the set of two or more extrusion parameters including a scale parameter that controls a scale factor for extrusion and a twist parameter that controls an angle of extrusion;
    obtaining another input specifying a weight function for modifying, based on a parametric interval along a length of a swept path, one or more of the extrusion parameters over the swept path;
    generating, based on the extrusion parameters, a sweep path for extruding the 2D representation of the object in a direction of an axis perpendicular to a 2D plane of the representation of the object; and
    performing a translational sweep of the 2D representation of the object to generate a three-dimensional (3D) extrusion from the 2D representation of the object according to the values of the extrusion parameters, the performing including modifying, via the weight function, the scale parameter or the twist parameter at two or more points along the sweep path during the sweep.

2. The computer-implemented method as recited in claim 1, further comprising:
    obtaining another input changing location of a reference point relative to a bounding box for the 2D representation of the object prior to generating the 3D extrusion from the 2D representation of the object according to the values of the extrusion parameters; and
    originating the sweep path at the specified reference point.

3. The computer-implemented method as recited in claim 1, wherein the set of two or more extrusion parameters further includes a depth parameter that controls amount of extrusion by specifying length of a sweep path for the extrusion, an X angle parameter that controls an angle of bend in the horizontal direction along the sweep path, and a Y angle parameter that controls an angle of bend in the vertical direction along the sweep path.

4. The computer-implemented method as recited in claim 3, wherein the performing includes modifying, via the weight function, the X angle parameter or the Y angle parameter at two or more points along the sweep path during the sweep.

5. The computer-implemented method as recited in claim 3, wherein the performing includes modifying, via the weight function, the scale parameter and the twist at two or more points along the sweep path during the sweep.

6. The computer-implemented method as recited in claim 3, wherein the performing includes modifying, via the weight function, the twist parameter at three or more points along the sweep path during the sweep.

7. The computer-implemented method as recited in claim 1, further comprising:
    obtaining another input specifying a shear effect for the extrusion; and
    shearing the extrusion surface according to either one or both of an X angle parameter value and a Y angle parameter value.

8. The computer-implemented method as recited in claim 1, wherein the one or more inputs modify the values of at least two of the set of two or more extrusion parameters.

9. A system, comprising:
    at least one processor; and
    a memory comprising processor-executable instructions that, responsive to execution by the at least one processor, cause the system to:
        obtain a two-dimensional (2D) representation of an object to be extruded;
        obtain two or more inputs each modifying a value for a respective one of a set of two or more extrusion parameters, the set of two or more extrusion parameters not defining the 2D representation of the object and including a twist parameter that controls an angle by which the 2D representation twists around a sweep path during extrusion, the sweep path generated in accordance with the extrusion parameters;
        obtain another input specifying a weight function for modifying, based on a parametric interval along a length of a sweep path, one or more of the extrusion parameters over the sweep path; and
        generate a three-dimensional (3D) extrusion from the 2D representation of the object according to the values of the extrusion parameters, the generating including modifying, via the weight function, the twist parameter of the extrusion at two or more points along the sweep path of the 3D extrusion.

10. The system as recited in claim 9, wherein to generate the 3D extrusion from the 2D representation of the object according to the values of the extrusion parameters, the memory comprises additional processor-executable instructions that, responsive to execution by the at least one processor, cause the system to automatically generate the sweep path for the 3D extrusion in a direction of an axis perpendicular to a 2D plane of the representation of the object according to the values of the extrusion parameters.

11. The system as recited in claim 10, wherein the memory comprises additional processor-executable instructions that, responsive to execution by the at least one processor, cause the system to:
    obtain another input changing location of a reference point relative to a bounding box for the 2D representation of the object prior to said generating a 3D extrusion from the 2D representation of the object according to the values of the extrusion parameters; and
    originate the sweep path at the specified reference point.

12. The system as recited in claim 9, wherein the set of two or more extrusion parameters further includes a depth parameter that controls amount of extrusion by specifying length of a sweep path for the extrusion, an X angle parameter that controls an angle of bend in the horizontal direction along the sweep path, a Y angle parameter that controls an angle of bend in the vertical direction along the sweep path, and a scale parameter that controls scale factor for extrusion.

13. The system as recited in claim 9, wherein the angle of the twist parameter specifies an angular twist between a front surface of the extrusion and a back surface of the extrusion, the angular twist not distributed evenly along an extruded surface of the extrusion.

14. One or more computer-readable storage devices comprising processor-executable instructions that, responsive to execution by a processor, implement a modeling module to:
   obtain a two-dimensional (2D) representation of an object to be extruded;
   obtain two or more numerical inputs each modifying a value for a respective one of a set of two or more extrusion parameters, the set of two or more extrusion parameters not defining the 2D representation of the object and including a twist parameter that controls an angle by which the 2D representation twists around a sweep path during extrusion, the angle of the twist parameter distributed evenly along the sweep path;
   obtain another input specifying a weight function for modifying, based on a parametric interval along a length of the sweep path, two or more of the extrusion parameters over the length of the sweep path; and
   generate a three-dimensional (3D) extrusion from the 2D representation of the object according to the values of the extrusion parameters, the generating including modifying, via the weight function, each of the twist parameter and another of the extrusion parameters at two or more points along the sweep path of the 3D extrusion.

15. The one or more computer-readable storage devices as recited in claim 14, wherein to generate the 3D extrusion from the 2D representation of the object according to the values of the extrusion parameters, the one or more computer-readable storage devices comprise additional processor-executable instructions that, responsive to execution by the processor, implement the modeling module to automatically generate the sweep path for the extrusion in a direction of an axis perpendicular to a 2D plane of the representation of the object according to the values of the extrusion parameters.

16. The one or more computer-readable storage devices as recited in claim 15, further comprising additional processor-executable-instructions that, responsive to execution by the processor, implement the modeling module to perform a translational sweep of the 2D representation of the object along the generated sweep path to generate the 3D extrusion.

17. The one or more computer-readable storage devices as recited in claim 15, further comprising additional processor-executable-instructions that, responsive to execution by the processor, implement the modeling module to:
   obtain another input changing location of a reference point relative to a bounding box for the 2D representation of the object prior to generating the 3D extrusion from the 2D representation of the object according to the values of the extrusion parameters; and
   originate the sweep path at the specified reference point.

18. The one or more computer-readable storage devices as recited in claim 14, wherein the set of two or more extrusion parameters further includes a depth parameter that controls amount of extrusion by specifying length of a sweep path for the extrusion, an X angle parameter that controls an angle of bend in the horizontal direction along the sweep path, a Y angle parameter that controls an angle of bend in the vertical direction along the sweep path, and a scale parameter that controls scale factor for extrusion.

* * * * *